Jan. 3, 1928.  
G. S. BACKUS  
1,654,717  
VACUUM FILTER LIQUID GUARD  
Filed Dec. 9, 1926
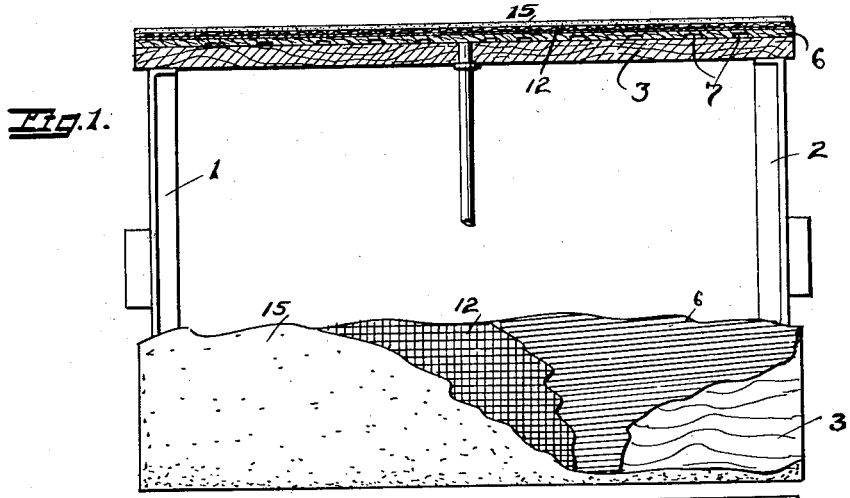
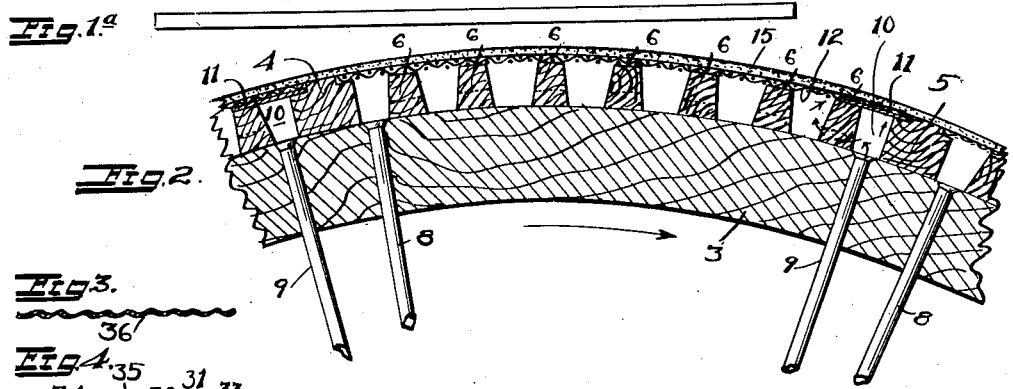
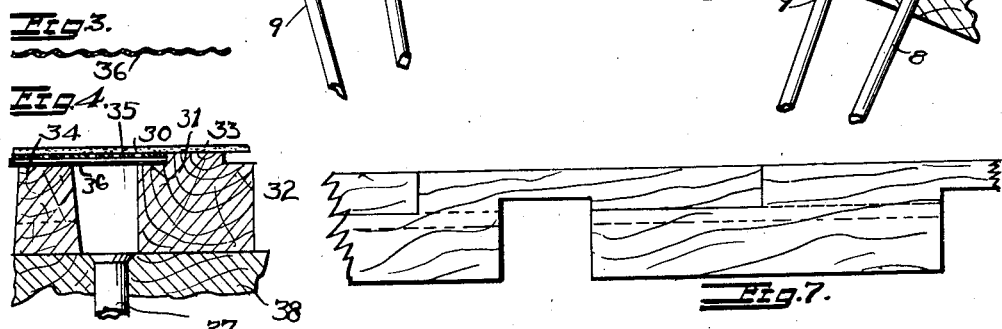
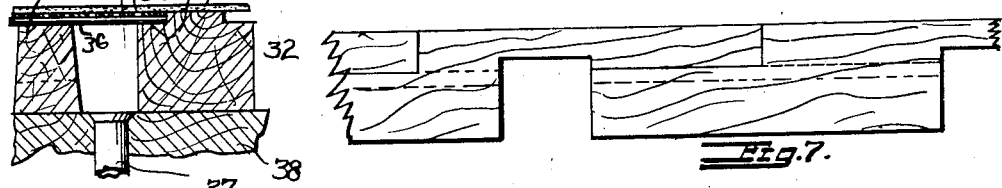
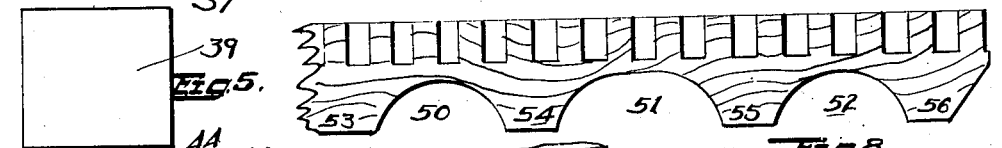
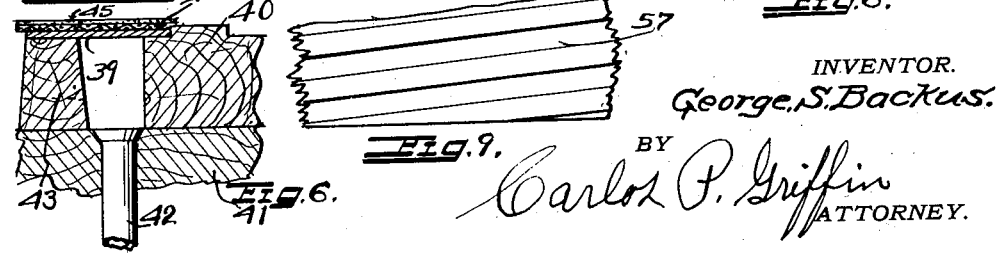
INVENTOR.  
George S. Backus.  
BY  
Carlos P. Griffin  
ATTORNEY.

Patented Jan. 3, 1928.

1,654,717

UNITED STATES PATENT OFFICE.

GEORGE S. BACKUS, OF OAKLAND, CALIFORNIA, ASSIGNOR TO OLIVER CONTINUOUS FILTER COMPANY, OF OAKLAND, CALIFORNIA, A CORPORATION OF CALIFORNIA.

VACUUM-FILTER LIQUID GUARD.

Application filed December 9, 1926. Serial No. 153,691.

This invention relates to a liquid guard for vacuum filters and its object is to prevent any of the liquid that may be in the vacuum pipes or in the lower portions of the several vacuum chambers when the filter surface is to be cleaned from back pressure, from blowing against the filter medium, and from being absorbed by the cake on the outside of the filter medium.

It will be understood by those skilled in the art that filters of the vacuum type are used in the filtration of all kinds of liquids and in some instances special forms of gases must be used in the filtration system to prevent the loss of the desirable material, as in the case of filtering gasoline no air must be permitted to get into the filtering circuit, or an explosion would be likely to take place, or at least the waste of the material which is sought to be filtered would take place to an uneconomical extent.

The attempt is made at all times to remove from the filter as much of the fluid whether water or any other liquid as possible, but inasmuch as the filter ordinarily operates quite slowly and inasmuch as more or less liquid is entrapped in the filtering chambers this is impossible to accomplish to the last degree, and there is always more or less of the fluid remaining in the lower portion of the filter chamber on its down travel when the blowing operation takes place.

With some forms of filtrate it is only necessary to provide against the liquid being blown directly against the inside of the filter medium to accomplish the desired results, and this is accomplished by placing a thin plate several inches square over the end of the pipe leading into each separate filter chamber thereby preventing whatever liquid that may be in that pipe from being blown against the filter medium and absorbed thereby. In other instances more of the fluid may be retained in the chamber of the filter, or the material collected on the outside of the filter may be particularly susceptible to the absorption of the liquid, and in this case it is necessary to extend the guard along the entire length of the filter thereby forming a small chamber within which some of the liquid can collect without at the same time allowing it to wet the fabric of the filter or touch in any way the cake collected on the outside of the filter.

Another object of the invention is to prevent the formation of blisters at the bottom edge of the filter chamber and thereby produce one portion of uncovered filter surface which will allow the liquid and the blowback gas used to pass out at one place instead of swelling up the filter cake over the entire area of the filter chamber as it should.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a vertical sectional view through an ordinary type of cylindrical drum filter with only one of the guard strips and filter sections being shown, a portion of the outside of the filter also being illustrated to show the position of the liquid guard, Figure 1ª is a side elevation of one of the liquid guard strips, Figure 2 is an enlarged sectional view of one filter chamber showing two of the guard strips used in connection with the filter, Figure 3 is an edge view of one of the guard strips as used in connection with sheet metal filter septum supports, Figure 4 is a sectional view of a portion of the filter chamber adjacent one of the guard strips shown in Figure 3 where a flat sheet metal screen is used for the support of the outer filter septum, Figure 5 is a plan view of one of the plates used to prevent the fluid in the pipe from blowing against the inside of the filter surface such as is used where little difficulty is found with the absorption of the fluid by the filter septum and the filter case, Figure 6 is a sectional view similar to Figure 4 where a woven wire screen is used over the fluid guard for the support of the outer filter septum, Figure 7 is an edge elevation of one type of filter supporting strips in which the filter supporting the surface is formed by a series of grooves in the outside of this strip and over which a screen is ordinarily placed or even the flat screen shown in Figure 4 for the support of the outer filter septum, and Figure 8 is a side elevation of the filter support shown in Figure 7, and Figure 9 is a plan view of the supporting strip shown in Figures 7 and 8.

The filter drum is in the present instance formed of two end spiders 1 and 2 which spiders are entirely covered by a wood lagging or staves 3, forming a complete cylinder. This cylinder is divided into a plurality of separate chambers on its surface by a series of separating strips as indicated at 4 and 5 on the larger view, Figure 2. The distance apart of the strips 4 and 5 will depend upon the size and various other considerations of the filter, but ordinarily these spaces will be about twelve inches to two feet apart, with a series of other filter surface supporting strips 6, placed longitudinally along the cylinder and at a distance about an inch apart peripherally as it is necessary to support the filter septum.

These strips are notched on their underside as indicated at 7, Figure 1 to allow the liquid to flow freely to the vacuum pipes which are attached to the inside of the drum formed by the staves.

The filter chambers have the pipes 8 and 9 secured thereto to form a vacuum in the filter chamber when necessary, and through which the air or gas blast is blown to remove the cake from the filter septum.

The direction of movement of the filter is indicated by the arrow on Figure 3, and necessarily between the time of the cleaning or washing of the filter, or between the time when it is removed from the vacuum effect to the time when the blast through the pipes 9 is started, whatever liquid may be inside the filter will flow down and collect in the lower compartment of any given filter action as indicated at Figure 2, and necessarily if the blast is put upon this small body of liquid the first thing to happen will be that the liquid in the compartment 10 will be blown against the underside of the filter surface, and that liquid will be blown out of the filter or will be absorbed by the waste cake and the liquid as well as the blast gas wasted. In order to prevent this the strip 11 is placed under the filter supporting screen 12 across the opening between the parting strip 5 and the next adjacent supporting strip 6. Since the liquid guard is only about three inches wide, it does not form a very large chamber with the parting strips 5 and 6, but it does prevent the liquid from being blown directly against the underside of the filter surface, and the blast passes under the next adjacent supporting strip 6 and in the direction of the arrows through the screen and out of the outer filter septum, thereby removing the cake without loss of liquid.

Inasmuch as the screen which supports the outer filter septum 15 is made of woven wire that material is open enough to permit the entire filter surface over the guard 11 to have the cakes blown therefrom, but if a flat supporting screen is used it then becomes necessary to corrugate the guard transversely, and this is illustrated in Figures 3 and 4.

Where flat metal screens are to be used for the support of the filter septum as indicated at 30 of Figure 4 the parting strip between the two chambers of the filter is rabbeted down slightly deeper as indicated at 31, and the parting strip 32 is wide enough to properly support the filter septum 33, while the supporting strip 34 also receives the corrugated strip and of course, the screen 30 extends over all of the supporting strips.

The liquid guard is then corrugated transversely of the small chamber 35, the guard being shown at 36 and the direction of its corrugation indicated in Figure 3, that is at right angles to the plane of Figure 4.

The drain pipes and blast pipe is shown at 37, while the stave of the cylinder is indicated at 38. It will thus be seen that the air blast or gas blast, passing through the pipe 37 will pass under the supporting strip 34 and then clean the remainder of the surface of the septum 33 over the guard 36; and this corrugated strip of course, extends the entire length of the drum in ordinary cases, but if it is found that the material to be treated does not readily absorb the moisture it is often sufficient to use either a corrugated or a flat strip such as is shown in Figure 5 at 39, only large enough to extend from the parting strip to the next supporting strip and four or five inches wide so that the blast of liquid coming out of the pipe 37 will not be directly blown against the underside of the filter surface.

In Figure 6 there is shown a sectional view of the manner of use of the small guard 39, the parting strip being indicated at 40, the drum staves at 41, the blast pipe at 42, the supporting strip at 43, and the screen filter septum support at 44, the septum is shown at 45, while the guard 39 is placed immediately over the end of the pipe 42.

The material of which these filters are made depends entirely upon the kind of material to be treated thereby, and it is sometimes necessary to use a different form of parting strip and supporting strip. In this event the supporting strip is that shown in Figures 7, 8 and 9, and it consists of a piece of wood about an inch thick by four inches wide with a series of three grooves run on its underside as indicated at 50, 51 and 52. This produces a series of supporting ridges 53, 54, 55 and 56, the opposite surface of the strip, which is ordinarily about 6 inches wide, is grooved into a series of small grooves extending slightly diagonally with respect to the length of the strip as indicated in Figure 9 at 57.

These supporting strips are used in exactly the same way as the supporting strip and separating strip 32 and the guard whether corrugated or flat is placed at the lower edge of one of these strips exactly as shown in Figures 4 and 6.

Having thus described my invention, what I desire to secure by Letters Patent of the United States is as follows, but modifications may be made in carrying out the invention as shown in the drawings and in the above particularly described form thereof, within the purview of the annexed claims:

1. In a vacuum filter liquid guard, a vacuum filter having a filter septum forming an enclosed vacuum and pressure chamber, pipes connected to said vacuum and pressure chamber for pulling a liquid through the filter septum and for causing a gas or liquid blast to pass outwardly from the filter chamber, and a metal plate extending the entire distance across the filter over the pipes to prevent any fluid therein from striking the underside of the filter septum when the cake is to be blasted therefrom.

2. In a filter liquid guard, a vacuum filter having a filter septum, and an enclosed vacuum and pressure chamber, pipes connected to said vacuum and pressure chamber for passing a liquid through the filter septum and for causing a gas or liquid blast to pass outwardly from the filter chamber, and a sheet metal plate placed over the pipes for blasting the fluid against the underside of the filter septum to prevent the fluid from directly striking said filter septum, said plate extending across the entire space of the cylinder at the lower edge of the filter chamber.

3. In a liquid guard for vacuum filters, the combination with a filter having a peripheral septum of a screen support for the filter septum, pipes connected to the filter beneath the filter septum, supports for the filter septum and its screen and a series of plates extending longitudinally the entire space of the filter over the pipe whereby any liquid collected in the filter is prevented from escaping therefrom when the cake is blown off the filter.

4. In a filter of the class described, a cylindrical filter having a septum, screens to support said septum, pipes connected with the cylinder and terminating inside several compartments under the filter septum, and a series of plates each plate adapted to be placed over two or more of said pipes and forming with a portion of the cylinder a small chamber adjacent the lower edge of each section of filter septum, whereby any liquid collected within the filter is prevented from being blown through the cake carried by the periphery of the filter.

In testimony whereof I have hereunto set my hand this 8th day of December, A. D. 1926.

GEORGE S. BACKUS.